United States Patent [19]

Samuelson et al.

[11] Patent Number: 4,919,492
[45] Date of Patent: Apr. 24, 1990

[54] MULTIPLE-CIRCUIT BRAKE SYSTEM

[75] Inventors: Hakan Samuelson, Enhörna; Eric Thoms, Akers Styckebruk, both of Sweden; Ingolf Grauel, Vaihingen/Enz, Fed. Rep. of Germany; Werner Stumpe, Kornwestheim, Fed. Rep. of Germany; Franz Maurer, Schwieberdingen, Fed. Rep. of Germany

[73] Assignees: SAAB-Scania AB, Sodertalje, Sweden; Robert Bosch GmbH, Stuttgart, Fed. Rep. of Germany

[21] Appl. No.: 500,720

[22] Filed: Jun. 3, 1983

[30] Foreign Application Priority Data

Aug. 20, 1982 [DE] Fed. Rep. of Germany ....... 3230970

[51] Int. Cl.$^5$ .......................... B60T 13/66; B60T 8/02
[52] U.S. Cl. ................................ 303/3; 303/15
[58] Field of Search ................. 303/6 R, 6 A, 22 R, 303/3, 15, 92, 7, 52, 119, 114, 84 A, 84 R, 0.01, 22.1; 188/195

[56] References Cited

U.S. PATENT DOCUMENTS

| | | | |
|---|---|---|---|
| 2,035,305 | 3/1936 | Eaton | 303/15 |
| 2,240,166 | 4/1941 | Stanley | 303/84 A |
| 3,131,975 | 5/1964 | Smith et al. | 303/104 |
| 3,497,267 | 2/1970 | Dobrikin | 303/3 |
| 3,507,542 | 4/1970 | Cannella | 303/15 |
| 3,680,314 | 8/1972 | Toomey | 188/345 |
| 3,802,745 | 4/1974 | Strifler et al. | 303/22 R |
| 3,856,361 | 12/1974 | Swanson | 303/6 R |
| 3,970,111 | 7/1976 | Brune et al. | 137/596.17 |
| 4,418,966 | 12/1983 | Hattwig | 303/22 R |

FOREIGN PATENT DOCUMENTS 2074679 11/1981 United Kingdom ................. 303/13

Primary Examiner—Alvin Oberley
Attorney, Agent, or Firm—Edwin E. Greigg

[57] ABSTRACT

A multiple-circuit brake system for motor vehicles in which a multiple-circuit braking value transducer is embodied partially electrically and partially as a pneumatic control valve and is intended for triggering pressure control valves, the wheel brake cylinders being disposed following these pressure control valves. One pressure-medium reservoir is associated with each pressure control valve, and the controlling energy for each of these pressure control valves is drawn from the pressure-medium reservoir associated with that valve. In the pneumatic brake circuit (I), a further pressure-medium reservoir is provided preceding the braking value transducer, as a result of which it is possible, with the aid of two-way check valves, to actuate the wheel brake cylinders with the pneumatic brake circuit (I) whenever the electrical brake circuits (II, III) have failed.

2 Claims, 2 Drawing Sheets

MULTIPLE-CIRCUIT BRAKE SYSTEM

BACKGROUND OF THE INVENTION

The invention is based on a multiple-circuit brake system for motor vehicles such as a tractor-trailer. A brake system of this type is known from German Offenlegungsschrift 29 37 657. In this known brake system, the multiple-circuit braking value transducer is a two-circuit compressed-air brake valve, which is combined with an electric potentiometer in order to actuate a third brake. As a result, however, this known brake system has many parts and is expensive.

OBJECT AND SUMMARY OF THE INVENTION

The multiple-circuit brake system has the advantage over the prior art in that it represents a simple structure for a multiple-circuit brake system, and the reliability of braking is assured in a particular manner. The electrical system provides that the main brake circuit is fast-acting, and the pressure medium supplies an auxiliary brake circuit which if the electrical system fails puts the brakes into operation upon the actuation of the braking value transducer.

A further advantage is that identical valves are used at several locations in the system. As a result, the equipment is very economical.

The invention will be better understood and further objects and advantages thereof will be better understood from the ensuing detailed description of preferred embodiments taken in conjunction with the drawings.

DESCRIPTION OF THE PREFERRED EMBODIMENTS

Figure 1:
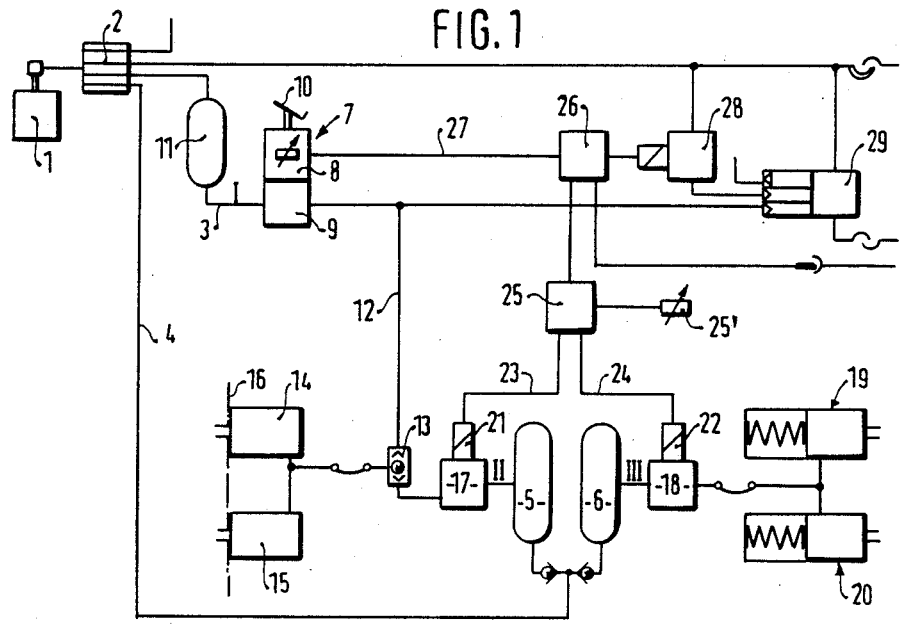
FIG. 1 shows a first embodiment of the brake system according to the invention.

A multiple-circuit brake system such as one disposed on a tractor, including a compressor 1 with a pressure regulator and a four-circuit protective valve 2, to which three operating brake circuits I, II and III are connected. The brake circuit I is a pneumatic brake circuit. The other two operating brake circuits II and III include a supply line 4, to which two supply tanks 5 and 6 are connected, which act as reservoirs for the pressure medium. A two-circuit braking value transducer 7 is also disposed on the tractor and has an electrical current transducer 8 and a fluid valve member 9, both of which are actuatable simultaneously by a driver of the vehicle via a pedal 10.

Preceding the two-circuit braking value transducer 7, in a supply line 3, is a further reservoir 11 for a fluid pressure medium, and a two-way check valve 13 is connected in fluid pressure line 12 which monitors the fluid access to two brake cylinders 14 and 15 of a front axle 16. The check valve 13 is disposed following the braking valve transducer 7 in a pressure-medium brake line 12 belonging to the pneumatic brake circuit I.

The other side of the two-way check valve 13 is connected via a pressure control valve 17 to the supply tank 5 through a short line. Parallel to the pressure control valve 17 is a pressure control valve 18 of the same type, which is indented for supplying two rear-axle brake cylinders 19 and 20 in the brake circuit III.

For their actuation, the two pressure control valves 17 and 18 each have an electromagnet 21 and 22 respectively, which are connected via respective electrical lines 23 and 24 to a load-dependent switching member 25 which is electronically controlled by a load sensor 25'. The switching member 25 is triggered by an electronic control unit 26, which is connected via an electrical line 27 to the electric current transducer 8.

A magnetic valve 28 is disposed following control unit 26 with which a control valve 29 for the brakes on a trailer can be electrically triggered.

MODE OF OPERATION

Upon the actuation of the braking value transducer 7, both the variable electric current transducer 8 and the fluid valve member 9 are switched over. The current reaches the electronic control unit 26 via the line 27 and is converted there; then a braking value is imposed by the load-dependent switching member 25, and the product is carried via the lines 23 and 24 to the electromagnets 21 and 22. These elements can be switched through in accordance with the prevailing times and electric-current intensities. The electromagnets 21 and 22 switch the pressure control valves 17 and 18 over, and stored air is directed in a controlled manner from the supply tanks 5 and 6 on a short path to the brake cylinders 14, 15 and 19, 20. Braking is effected with appropriately metered force. In the case of the front-axle brakes, a second position of the two-way check valve 13 is thereby blocked off.

In a slower manner, as compared with the electric-current actuation, compressed air passes from the reservoir 11 via the valve member 9 into the brake line 12. However, since the two-way check valve 13 has already been switched over, this imposition of pressure has no effect.

However, should the electrical system fail, then as a result of the pressure increase in the brake line 12, the two-way check valve 13 is switched over into its other terminal position, and air for braking cylinders 14 and 15 flows into the brake cylinders 14 and 15 of the front axle 16 of the vehicle, so that it remains possible to bring the vehicle to a stop.

Figure 2:
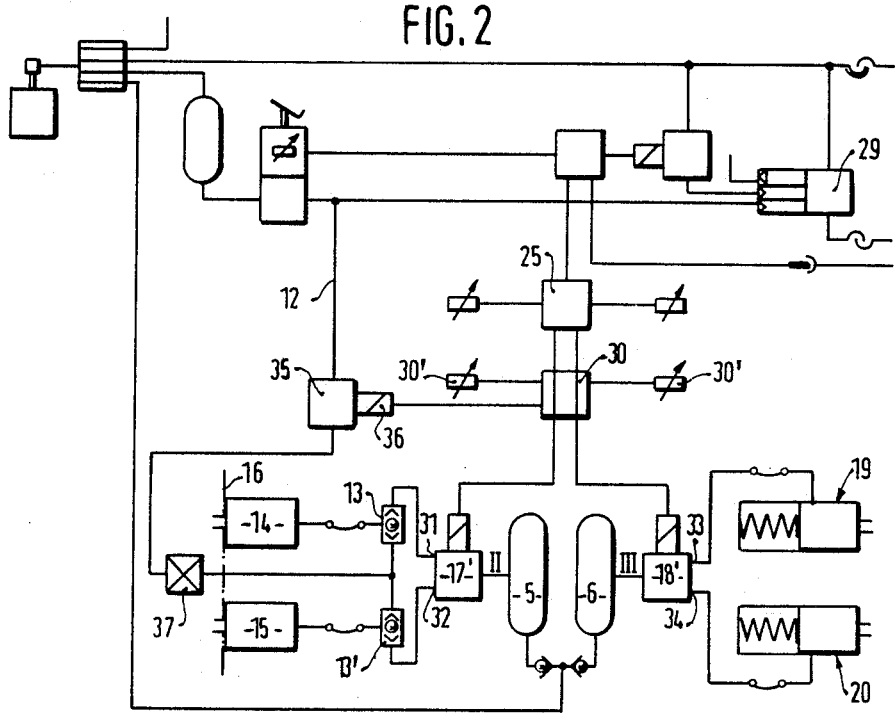
FIG. 2 shows a further development of the design shown in FIG. 1, having an anti-skid apparatus.

FIG. 2 shows a further development of the design according to FIG. 1; the same reference numerals as in FIG. 1 are used for corresponding elements. An electronic switching member 30 of an anti-skid apparatus is disposed following the switching member 25 and receives signals from wheel rpm sensors 30'. Two pressure control valves 17' and 18' are embodied in the dual-channel manner; that is, they each have two separate outputs 31, 32 and 33, 34, respectively, and one two-way check valve 13 and 13' is provided for each of the two outputs 31 and 32 of the front-axle brake. For anti-skid monitoring, a 3/2-way valve 35 is also inserted into the pressure-medium brake line 12; this valve 35 is actuatable by a electromagnet 36, which is connected to the electronic switching member 30. Finally, a pressure reduction valve 37 is also inserted into the line 12, in order that on the one hand, the pressure of the pneumatic circuit will be restrained in the two-way check valves 13 and 13' in comparison with that of the electric circuit, while on the other, it will nevertheless still be possible to supply the full pressure to the trailer control valve 29.

By using the 3/2-way valve 35, a complete anti-skid control can be established, with reduction, maintenance, or increase of a given pressure level. This control functions in the dual-channel manner for both the front and rear axles; however, for the rear axle it functions only with an electric brake circuit.

Figure 3:
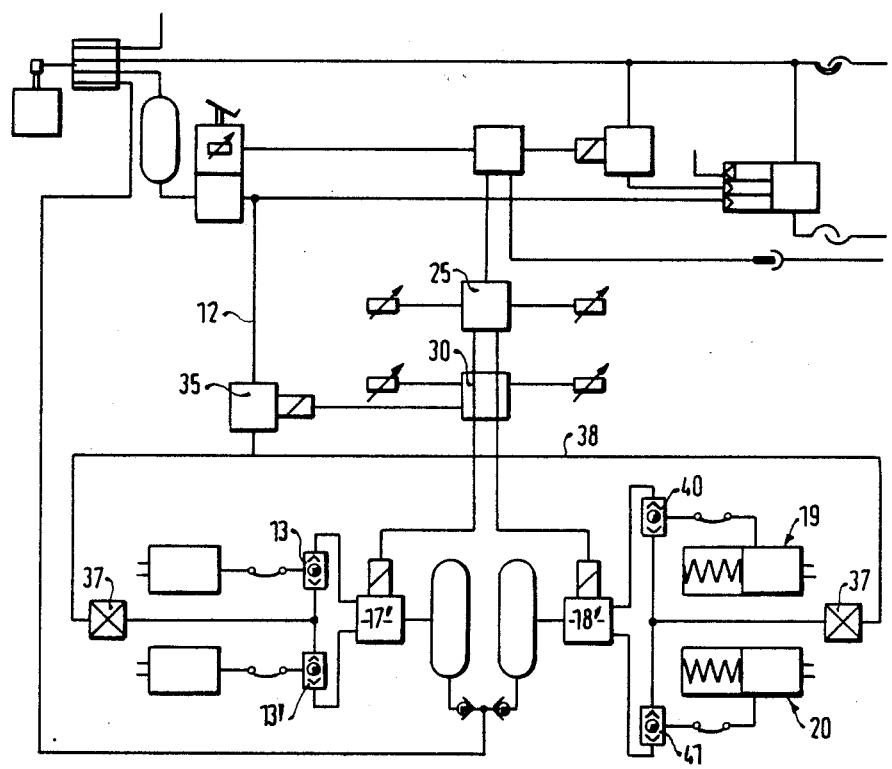
FIG. 3 shows a brake system having, as an auxiliary brake, compressed-air braking on all wheels.

If operation is intended with both an electric and a pneumatic brake circuit at the rear axle as well, than a branch line 38 of the pressure-medium brake line 12 must be provided leading to the rear-axle brake cylinders 19 and 20, such as is shown in FIG. 3, and one two-way check valve 40 and 41 must be disposed preceding each rear-axle brake cylinder 19 and 20.

With such a design, it is then possible to actuate both the front-axle and the rear-axle brakes via the pneumatic circuit on an auxiliary basis, if the electrical system should fail. The anti-skid apparatus can be imposed in this case as well.

The foregoing relates to preferred exemplary embodiments of the invention, it being understood that other variants and embodiments thereof are possible within the spirit and scope of the invention, the latter being defined by the appended claims.

We claim:

1. A multiple-circuit brake system for motor vehicles including front and rear wheel axles, equipped with front and rear brake cylinders thereon, comprising a multiple-circuit braking value transducer, said multiple-circuit braking value transducer including a variable electrical control section which varies electric-current intensities and a fluid-medium control section, which for brake actuation simultaneously controls at least one fluid pressure-medium brake circuit and one electrically triggered brake circuit, said electrically triggered brake circuit being equipped with at least one electronic switching member and first and second electrically triggered fluid-medium control valves for respectively controlling fluid-medium flow to said front and rear brake cylinders, said fluid medium control section of said brake value transducer including an input and an output, said at least on fluid pressure-medium brake circuit comprising a first fluid-medium supply line connected to said input of said fluid medium control section and a first fluid pressure-medium brake line connected to said output of said fluid medium control section, a first fluid medium reservoir disposed in said first fluid medium supply line to said input of said braking value transducer associated with the at least one fluid pressure-medium brake circuit, at least one two-way check valve, said at least one two-way check valve includes a first inlet side connected to said first fluid pressure medium brake line connected to said output of said fluid-medium control section of said braking value transducer and an outlet side connected to a second fluid pressure medium brake line connected to at least one of said front brake cylinders for controlling fluid pressure to the front brake cylinder, said two-way check valve further including a second inlet side which is connected to a third fluid pressure-medium brake line connected to said first electrically triggered fluid medium control valve which controls a fluid-medium under pressure from a second fluid-medium supply line via a first branch line to said second inlet side of said two way check valve and then out through the outlet side of said two-way check valve to said front brake cylinder, said two-way check valve being triggered directly by pressure from said first electrically triggered fluid medium control valve, said second electrically triggered fluid medium control valve being connected to said fluid medium supply line via a second branch line for controlling fluid under pressure in said second fluid medium supply line to said rear brake cylinders, a second reservoir connected to said first branch line and connected to said first electrically triggered fluid control valve and a third reservoir connected to said second branch line and connected to said second electrically triggered fluid control valve whereby said front brake cylinders may be controlled electrically as well as by fluid pressure and said rear brake cylinders may be operated electrically.

2. A multiple-circuit brake system as defined by claim 1, which includes a second two-way check valve, said first fluid pressure medium brake line being connected to a first inlet side of said second two-way check valve, said second two-way check valve having a second inlet side connected to said third fluid pressure medium brake line and an outlet side connected to a fourth fluid pressure medium brake line connected to another front brake cylinder thereby each of said front brake cylinders has one of said two-way check valves therein, and that a 3/2-way valve device of an anti-skid apparatus is disposed in said first fluid medium pressure brake line between said fluid medium control section of said braking transducer and at least one of said two-way check valves, in which said first fluid pressure medium brake line is supplied by said first fluid medium reservoir in said first fluid medium supply line to said braking value transducer.

* * * * *